(12) United States Patent
Nakajima

(10) Patent No.: US 11,633,990 B2
(45) Date of Patent: Apr. 25, 2023

(54) TIRE

(71) Applicant: SUMITOMO RUBBER INDUSTRIES, LTD., Hyogo (JP)

(72) Inventor: Koichi Nakajima, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 622 days.

(21) Appl. No.: 16/417,991

(22) Filed: May 21, 2019

(65) Prior Publication Data

US 2019/0359008 A1    Nov. 28, 2019

(30) Foreign Application Priority Data

May 22, 2018   (JP) ............................. JP2018-098171

(51) Int. Cl.
*B60C 11/13*   (2006.01)
*B60C 11/03*   (2006.01)

(52) U.S. Cl.
CPC ...... *B60C 11/1307* (2013.01); *B60C 11/1353* (2013.01); *B60C 2011/0353* (2013.01); *B60C 2011/0355* (2013.01)

(58) Field of Classification Search
CPC ............. B60C 11/1353; B60C 11/1307; B60C 11/042; B60C 11/047
See application file for complete search history.

(56) References Cited

U.S. PATENT DOCUMENTS

| 6,415,835 B1 * | 7/2002 | Heinen ............... B60C 11/0309 |
| | | 152/209.21 |
| 2009/0194212 A1 * | 8/2009 | Bonko ............... B60C 11/1353 |
| | | 152/209.21 |
| 2013/0333818 A1 * | 12/2013 | Yamaguchi ........... B60C 11/042 |
| | | 152/523 |

(Continued)

FOREIGN PATENT DOCUMENTS

| EP | 2985157 A1 | 2/2016 |
| JP | 2002036820 A * | 2/2002 |

(Continued)

OTHER PUBLICATIONS

European Search Report, European Patent Office, Application No. 19172217.2, dated Aug. 1, 2019, 7pages.

*Primary Examiner* — Cedrick S Williams
(74) *Attorney, Agent, or Firm* — Greenblum & Bernstein, P.L.C.

(57) ABSTRACT

A tire having a circumferential groove having a groove bottom and a pair of groove walls. The groove bottom is provided with groove bottom raised portions protruding radially outwardly from a reference plane 5a. The groove bottom raised portions are a first groove bottom raised portion located on a first side in the width direction of the circumferential groove and a second groove bottom raised portion located on a second side in the width direction. The first and second groove bottom raised portions each has a plurality of repeating units having a first bottom surface extending substantially in the tire radial direction and a (Continued)

second bottom surface inclined with respect to the tire radial direction at a larger angle than the first bottom surface. The inclination direction of the second bottom surfaces of the first groove bottom raised portion is opposite to the inclination direction of the second bottom surfaces of the second groove bottom raised portion.

21 Claims, 7 Drawing Sheets

(56) References Cited

U.S. PATENT DOCUMENTS

2016/0152093 A1\* 6/2016 Sakiyama ............... B60C 11/04
152/209.1

FOREIGN PATENT DOCUMENTS

| JP | 2005-231600 | A |   | 9/2005 |
|----|-------------|---|---|--------|
| JP | 2008189240  | A | \* | 8/2008 |
| JP | 2016-137763 | A |   | 8/2016 |

\* cited by examiner

TIRE

TECHNICAL FIELD

The present invention relates to a tire provided in the tread portion with a circumferential groove extending continuously in the tire circumferential direction, more particularly to a configuration of the inner surface of the circumferential groove.

BACKGROUND ART

Conventionally, in order to improve on-snow performance of a vehicle tire, there have been made attempts to specifically defining the groove wall shape of circumferential grooves formed in the tread portion. For example, Patent Document 1 below proposes a tire whose on-snow performance is improved by providing widened portions in a circumferential groove.

Patent document 1: Japanese Patent Application Publication No. 2016-137763

SUMMARY OF THE INVENTION

Problems to be Solved by the Invention

In the tire of Patent Document 1, however, there is a possibility that driving force and braking force become insufficient when running on snow, depending on use conditions. Thus, the tire is required to be further improved in the on-snow performance.

Therefore, the present invention was made, and a primary object of the present invention is to provide a tire of which on-snow performance is improved by specifically defining the shape of a circumferential groove.

According to the present invention, a tire comprises:

a tread portion having a tread surface and provided with a circumferential groove extending continuously in the tire circumferential direction, the circumferential groove having a groove bottom and a pair of groove walls extending in a tire radial direction from the groove bottom toward the tread surface, wherein the groove bottom is provided with groove bottom raised portions protruding radially outwardly from a groove bottom reference plane which is defined by a plane being parallel to the tread surface and positioned at a deepest position of the circumferential groove, the groove bottom raised portions include a first groove bottom raised portion located on a first side in a width direction of the circumferential groove, and a second groove bottom raised portion located on a second side in the width direction of the circumferential groove, and each of the first groove bottom raised portion and the second groove bottom raised portion comprises a plurality of repeating units each comprising a first bottom surface extending substantially in the tire radial direction, and a second bottom surface inclined with respect to the tire radial direction at a larger angle than the first bottom surface, and the direction of the inclination of the second bottom surface of the first groove bottom raised portion is opposite to the direction of the inclination of the second bottom surfaces of the second groove bottom raised portion.

It is possible that the first bottom surfaces of the first groove bottom raised portion are respectively disposed at the same positions in the tire circumferential direction as the first bottom surfaces of the second groove bottom raised portion.

It is possible that the first bottom surfaces of the first groove bottom raised portion are respectively disposed at different positions in the tire circumferential direction from the first bottom surfaces of the second groove bottom raised portion.

It is preferable that the radial height of each of the first bottom surfaces from the groove bottom reference plane is not less than 1 mm.

It is preferable that the radial height of each of the first bottom surfaces from the groove bottom reference plane is not less than 3% of a distance in the tire circumferential direction between the first bottom surfaces adjacent in the tire circumferential direction.

The pair of groove walls are a first groove wall positioned on the first side and a second groove wall positioned on the second side, and it is preferable that at least one of the first groove wall and the second groove wall is provided with a groove wall protruding portion protruding inward of the circumferential groove from a groove wall reference plane defined by a plane being parallel to the tire circumferential direction and positioned at a widest position of the groove width of the circumferential groove, and the groove wall protruding portion comprises a plurality of repeating units each comprising a first wall surface extending in the tire widthwise direction, and a second wall surface inclined with respect to the tire widthwise direction at a larger angle than the first wall surface.

It is preferable that each of the first groove wall and the second groove wall is provided with the groove wall protruding portion, and in the top view of the circumferential groove, the second wall surfaces of the first groove wall are substantially parallel to the second wall surfaces of the second groove wall.

It is preferable that the first wall surfaces are respectively disposed at the same positions in the tire circumferential direction as the first bottom surfaces.

It is preferable that the protruding amount in the tire widthwise direction of each of the first wall surfaces from the groove wall reference plane is not less than 1 mm.

It is preferable that the protruding amount in the tire widthwise direction of each of the first wall surfaces from the groove wall reference plane is not less than 3% of a distance in the tire circumferential direction between the first wall surfaces adjacent in the tire circumferential direction.

In the tire according to the present invention, since the circumferential groove is provided in the groove bottom with the groove bottom raised portions, the circumferential groove can improve the on-snow performance of the tire owing to the groove bottom raised portions biting into the snow compressed into the circumferential groove.

Further, since the first groove bottom raised portion and the second groove bottom raised portion are each comprises the plurality of repeating units each comprising the first bottom surface extending substantially in the tire radial direction, and the second bottom surface inclined at a larger angle than the first bottom surface, the compressing of the snow is furthered by the first bottom surfaces and the second bottom surfaces, and as a result, even when the tire is worn, the groove bottom raised portions can derive a large shear force from the compressed snow.

Furthermore, since the inclination direction of the second bottom surfaces of the first groove bottom raised portion is opposite to the inclination direction of the second bottom surfaces of the second groove bottom raised portion, the groove bottom raised portions can exert comparable on-snow performance regardless of the direction of rotation of the tire.

Therefore, in the tire according to the present invention, both the driving force and the braking force at the time of running on snow can be improved, and the on-snow performance can be improved regardless of the direction of rotation of the tire.

DESCRIPTION OF THE PREFERRED EMBODIMENTS

Embodiments of the present invention will now be described in detail in conjunction with accompanying drawings.

The present invention is suitably applied to winter tires for traveling on snow, for example, studless tires, snow tires, all season tires and the like. But, the present invention can be applied to various tires including pneumatic tires and non-pneumatic tires so called airless tires as far as it has a tread portion.

Figure 1:
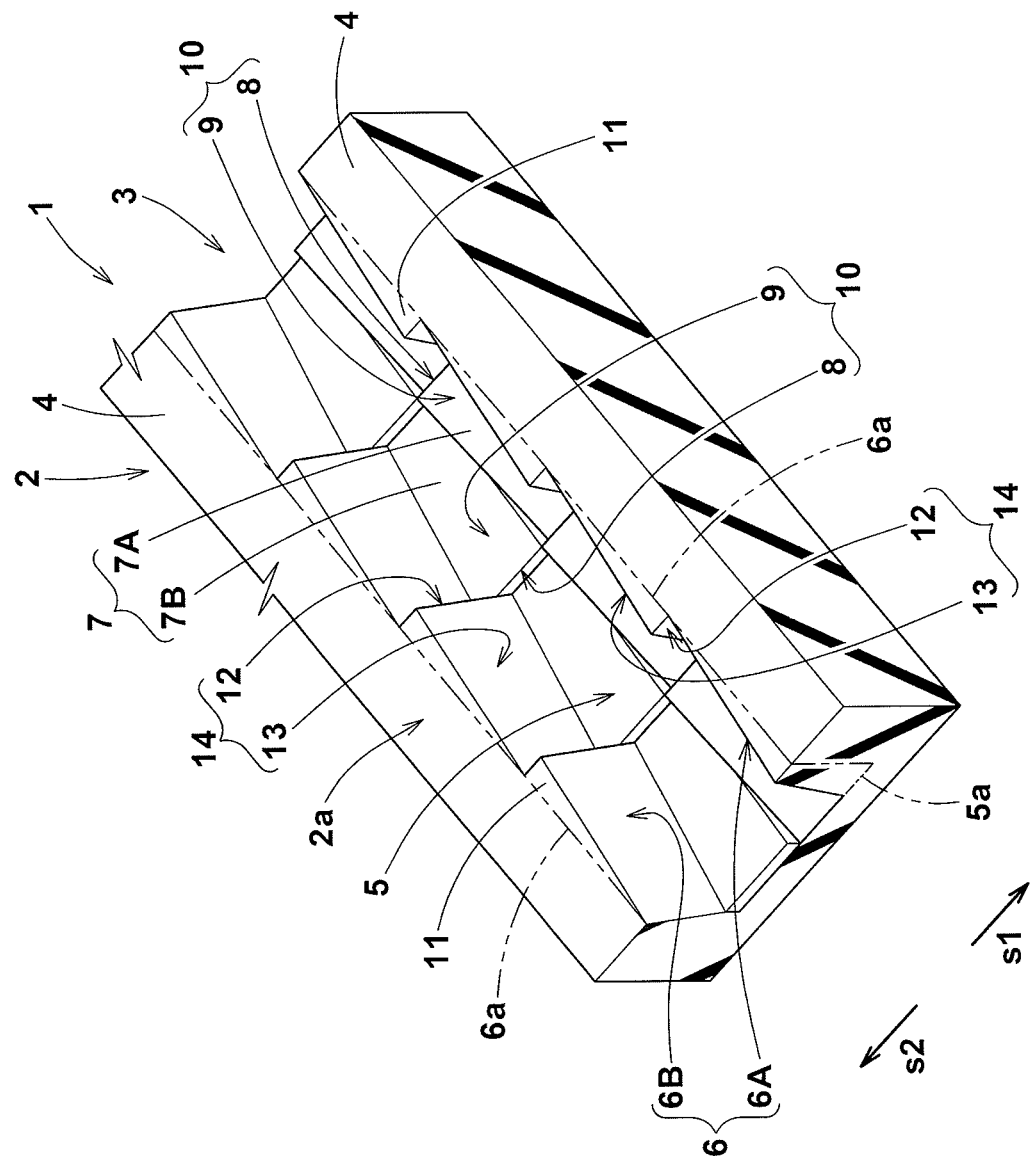
FIG. 1 is a perspective partial view of a circumferential groove of a tire as an embodiment of the present invention.
Figure 2:
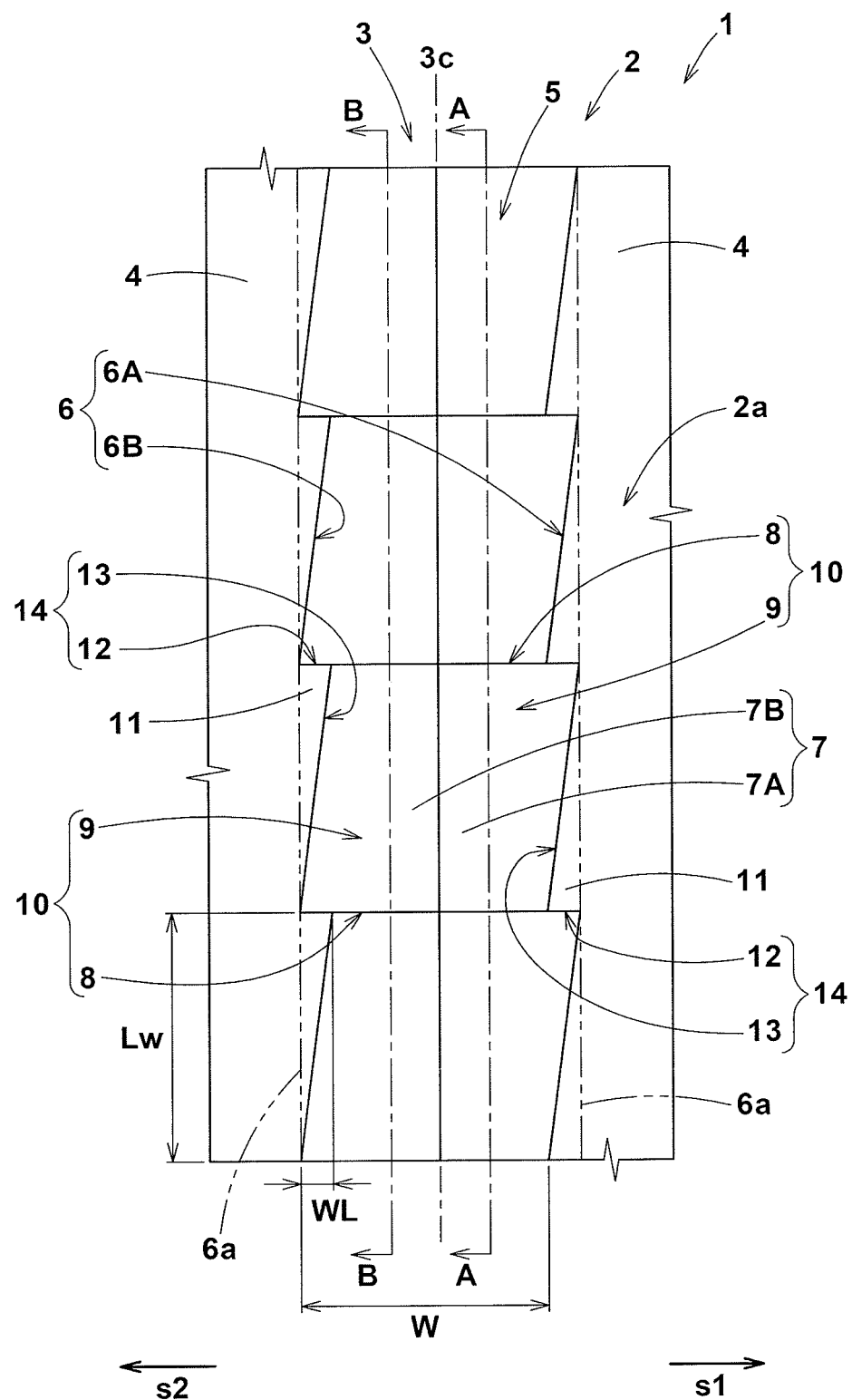
FIG. 2 is a partial top view of the circumferential groove.

FIG. 1 is a perspective view showing a circumferential groove 3 of a tire 1 as an embodiment of the present invention, and FIG. 2 is a partial top view of the circumferential groove 3. As shown, the tire 1 comprises a tread portion 2 whose radially outer surface defines a tread surface 2a contacting with the ground.

The tread portion 2 is provided with at least one circumferential groove 3 continuously extending in the tire circumferential direction, and a plurality of land portions 4 divided by the circumferential groove 3.

Figure 3:
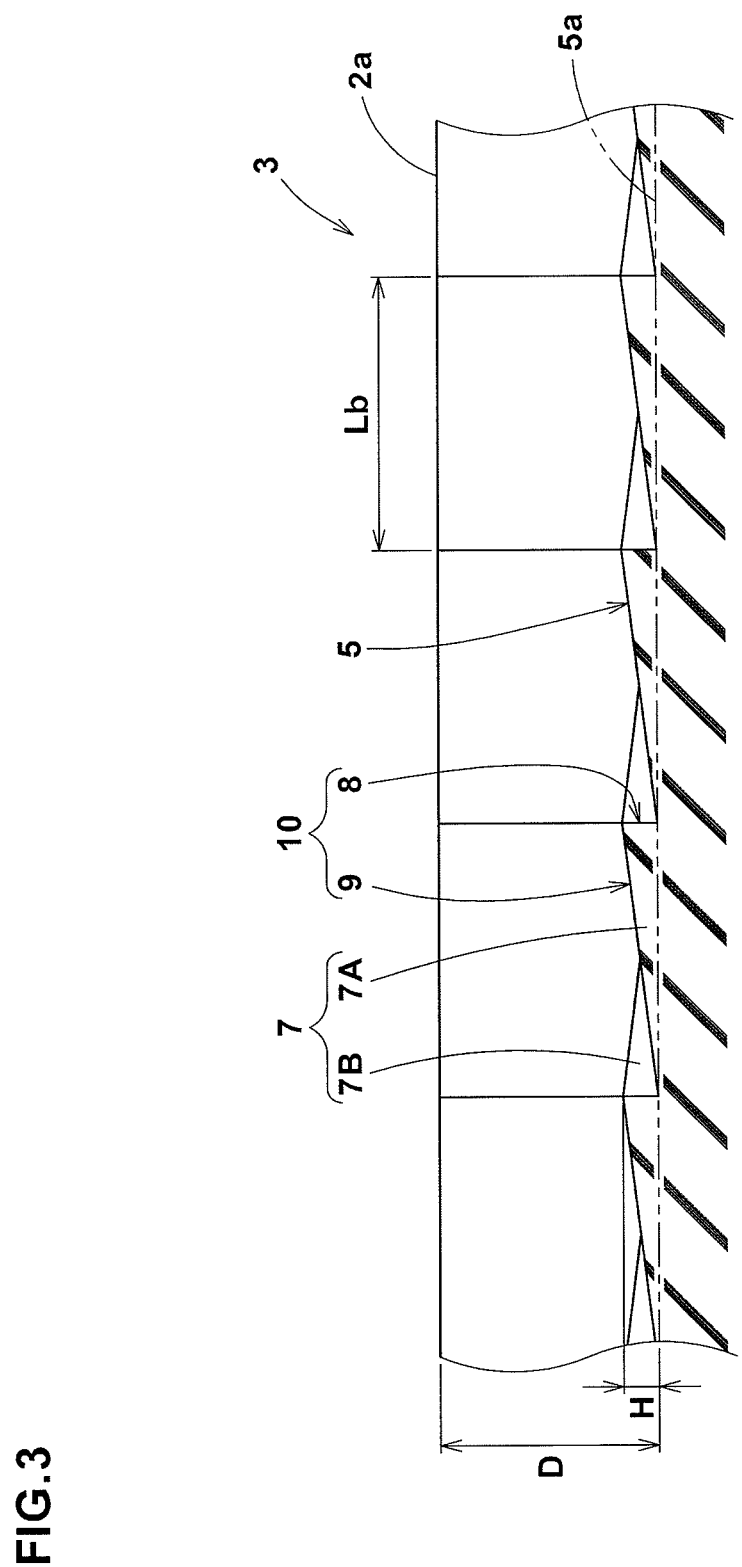
FIG. 3 is a cross-sectional view taken along line A-A of FIG. 2.
Figure 4:
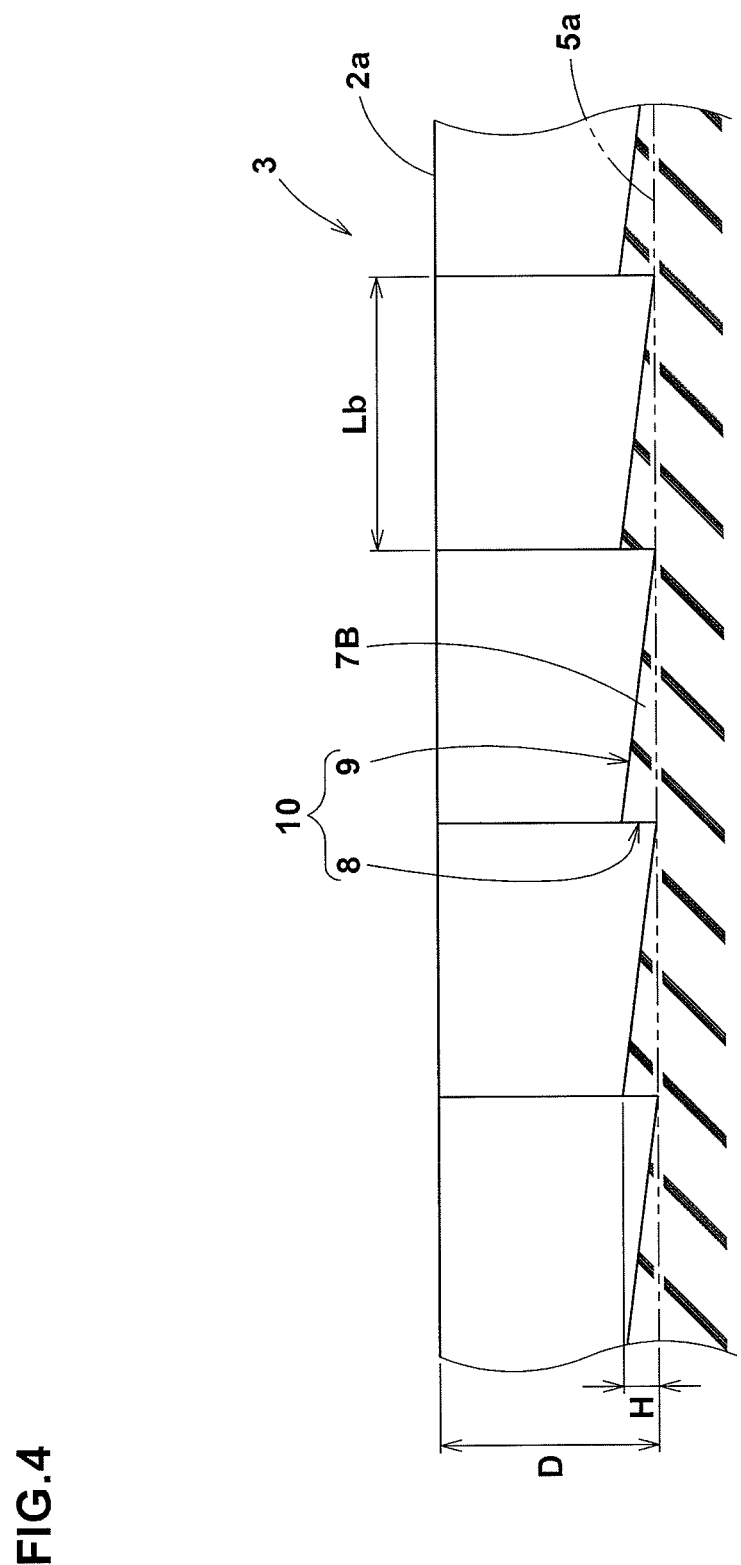
FIG. 4 is a cross-sectional view taken along line B-B of FIG. 2.
Figure 5:
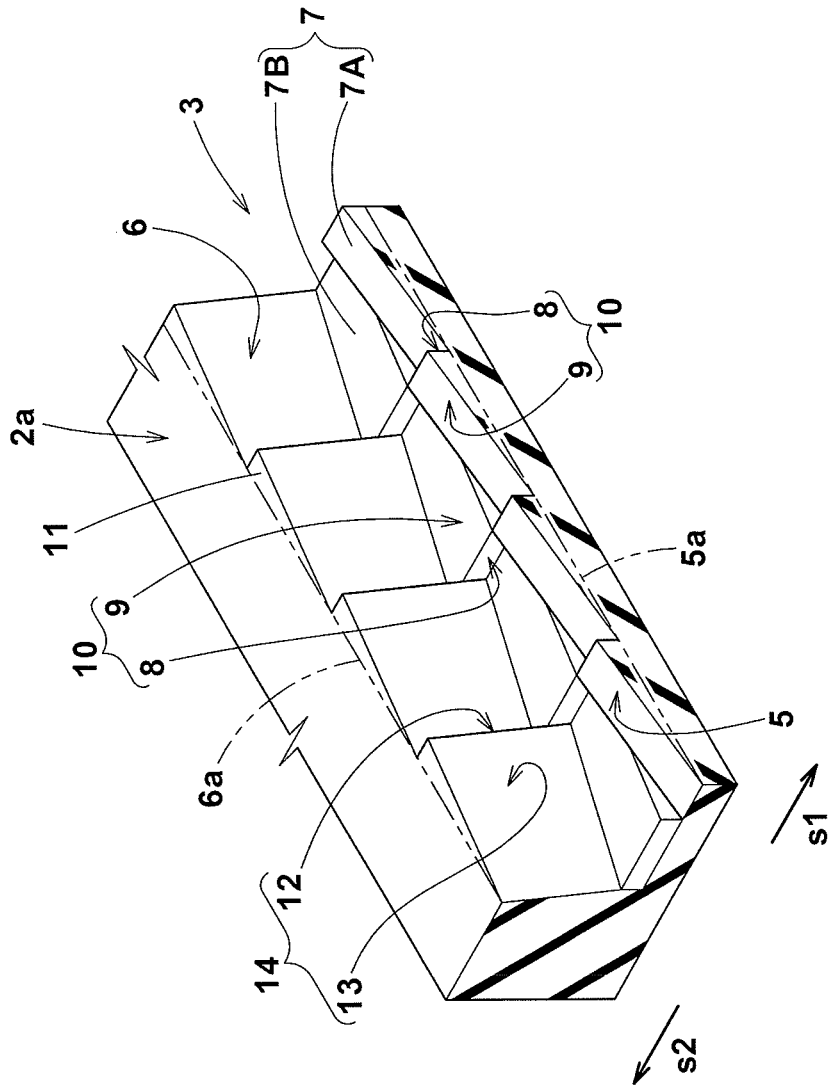
FIG. 5 is a cross-sectional perspective view of the circumferential groove of FIG. 1.

FIG. 3 is a cross-sectional view taken along line A-A of FIG. 2. FIG. 4 is a cross-sectional view taken along line B-B of FIG. 2. FIG. 5 is a cross-sectional perspective view of the circumferential groove 3 of FIG. 1.

As shown, the circumferential groove 3 has a groove bottom 5 and a pair of groove walls 6 extending in a tire radial direction from the groove bottom 5 toward the tread surface 2a.

In this application, an expression "(an object) extends in a direction" means that (the object) has a component which is largest in the above-said direction.

The groove bottom 5 is provided with groove bottom raised portions 7 which protrude radially outwardly from a groove bottom reference plane 5a, wherein the groove bottom reference plane 5a is defined by a plane being parallel to the tread surface 2a and positioned at the deepest point of the groove depth D of the circumferential groove 3.

Owing to the groove bottom raised portions 7 biting into the snow compressed into the circumferential groove 3 during running, such circumferential groove 3 can improve the on-snow performance of the tire. As a result, the tire 1 can maintain good on-snow performance even in worn conditions.

In addition, since such groove bottom raised portions 7 can disturb vibrations of the air in the circumferential groove 3 and reduce the air resonance noise during running on a well paved road surface, therefore, noise performance of the tire 1 can be improved.

In the present embodiment, the groove bottom raised portions 7 include a first groove bottom raised portion 7A located on a first side S1 in the width direction of the circumferential groove 3, and a second groove bottom raised portion 7B located on a second side S2 in the width direction of the circumferential groove 3.

Each of the first groove bottom raised portion 7A and the second groove bottom raised portion 7B comprises a plurality of repeating units 10 each comprising a first bottom surface 8 extending substantially in the tire radial direction, and a second bottom surface 8 inclined with respect to the tire radial direction at a larger angle than the first bottom surface 8. Here, the expression "(a surface) extends substantially in the tire radial direction" means that (the surface) may be inclined at an angle in a range from −10 degrees to +10 degrees with respect to the tire radial direction.

By the first bottom surfaces 8 and the second bottom surfaces 9 of the groove bottom raised portions 7, the compressing of the snow in the circumferential groove is furthered, and the shear force of the compressed snow block is increased even when the tire 1 is worn.

In the present embodiment, the inclination direction of the second bottom surfaces 9 of the first groove bottom raised portion 7A is opposite to the inclination direction of the second bottom surfaces 9 of the second groove bottom raised portion 7B.

Such groove bottom raised portions 7A and 7B can exert comparable on-snow performance, regardless of the direction of rotation of the tire 1. Further, both the driving force and the braking force at the time of running on snow can be improved. Thus, regardless of the direction of rotation of the tire 1, the on-snow performance can be improved.

In the present embodiment, the first bottom surfaces 8 of the first groove bottom raised portion 7A are respectively disposed at the same positions in the tire circumferential direction as the first bottom surfaces 8 of the second groove bottom raised portion 7B. Such groove bottom raised portions 7A and 7B ensure that the first bottom surfaces 8 of the first groove bottom raised portion 7A and the first bottom surfaces 8 of the second groove bottom raised portion 7B simultaneously bite into the snow, which further improve the on-snow performance of the tire 1.

In the present embodiment, each of the first bottom surface 8 and the second bottom surface 9 is a flat surface. However, one of or each of the first bottom surface 8 and the second bottom surface 9 may be a curved surface, or a combination of a plurality of flat surfaces.

In the present embodiment, the border between the first groove bottom raised portion 7A and the second groove bottom raised portion 7B is positioned on the widthwise center line 3c of the circumferential groove 3 in the top view thereof as shown in FIG. 2. Such groove bottom raised portions 7A and 7B can exert comparable on-snow performance regardless of the direction of rotation of the tire 1 because the first groove bottom raised portions 7A and the second groove bottom raised portions 7B are arranged evenly in the widthwise direction, more specifically, arranged in 180-degree rotational symmetry.

It is however also possible that the boundary between the first groove bottom raised portion 7A and the second groove bottom raised portion 7B may be set at a position different from the widthwise center line 3c of the circumferential groove 3 in the top view. In this case, it is preferable to arrange another circumferential groove which is the same as the circumferential groove 3 except that the arrangement of the first groove bottom raised portion 7A and the second groove bottom raised portion 7B is mirror symmetrical. Thereby, comparable on-snow performance can be obtained regardless of the direction of rotation of the tire 1.

As shown in FIGS. 3 and 4, the protruding height H in the tire radial direction from the groove bottom reference plane 5a of the first bottom surfaces 8 (or the second bottom surfaces 9) is preferably not less than 1 mm.

If the protruding height H is smaller than 1 mm, the effect of compressing the snow in the circumferential groove 3 may be reduced, and the shear force of the compressed snow block for exerting the driving force may not be increased.

It is preferable that the protruding height H is smaller than the height in the tire radial direction from the groove bottom reference plane 5a of a tread wear indicator (not shown) provided in the circumferential groove 3 to indicate the wear limit of the tire 1. The groove bottom raised portions 7 having such groove bottom configuration ensures that, even when the tread portion is worn up to the wear limit of the tire 1, the first bottom surfaces 8 bite into the snow in the circumferential groove, and the tire 1 can maintain good on-snow performance.

The protruding height H of the first bottom surfaces 8 is preferably set to be not less than 3% of the distance Lb in the tire circumferential direction between the first bottom surfaces 8 adjacent in the tire circumferential direction. Thereby, the first bottom surfaces 8 bite into the snow appropriately and exert a large driving force. Thus, the on-snow performance of the tire 1 can be improved.

As shown in FIG. 1 and FIG. 2, the pair of groove walls 6 are a first groove wall 6A located on the first side S1, and a second groove wall 6B located on the second side S2.

It is preferable that at least one of the first groove wall 6A and the second groove wall 6B is provided with a groove wall protruding portion 11 protruding inward of the circumferential groove 3 from a groove wall reference plane 6a. The groove wall reference plane 6a is defined by a plane being parallel to the tire circumferential direction and positioned at the widest position of the groove width W of the circumferential groove 3.

With such circumferential groove 3, the groove wall protruding portion 11 bites into the snow therein, and the on-snow performance can be improved. In addition, since such groove wall protruding portion 11 can disturb vibrations of the air in the circumferential groove 3 and reduce the air resonance noise during running, the noise performance of the tire 1 can be improved.

In the present embodiment, as shown in FIGS. 1, 2 and 5, the groove wall protruding portion 11 comprises a plurality of repeating units 14 each comprising a first wall surface 12 extending in the tire widthwise direction, and a second wall surfaces 13 inclined with respect to the tire widthwise direction at an angle larger than the first wall surface 12. The groove wall 6 having such groove wall protruding portion 11 can improve the driving force and the braking force when running on snow because the first wall surfaces 12 increase the component in the tire widthwise direction of the groove edge. In addition, the snow moved along and relatively to the second wall surface 13 is compressed, and increased in the shear force.

Therefore, the tire 1 of the present embodiment can be further improved in the on-the-snow performance as the groove bottom raised portions 7 bite into the snow compressed by the groove wall 6. In addition, such circumferential groove 3 can further improve the on-snow performance because, when a portion of the circumferential groove 3 enters into the ground contacting patch and then goes out thereof during running, the groove bottom raised portion 7 and the groove wall protruding portion 11 in this portion are deformed, and self-ejection of the snow from the circumferential groove 3 is induced.

In the present embodiment, the first wall surfaces 12 are respectively disposed at the same positions in the tire circumferential direction as the first bottom surfaces 8. Such circumferential groove 3 can more effectively improve the on-snow performance owing to the groove bottom raised portions 7 biting into the snow compressed by the groove walls 6.

In the present embodiment, each of the first wall surface 12 and the second wall surface 13 is a flat surface.

It is preferable that the second wall surfaces 13 of the first groove wall 6A are substantially parallel to the second wall surfaces 13 of the second groove wall 6B in the top view of the circumferential groove 3 as shown in FIG. 2. As a results, the groove wall protruding portion 11 can exert comparable on-snow performance regardless of the direction of rotation of the tire 1.

In the present specification, the expression "(an object is) substantially parallel (to another object)" means that the angular difference between the objects is at most 5 degrees.

Preferably, the protruding amount WL in the tire widthwise direction of the first wall surfaces 12 from the groove wall reference plane 6a is not less than 1 mm. If the protruding amount WL is smaller than 1 mm, the effect of compressing the snow existing in the circumferential groove 3 may be reduced, and the shear force of the compressed snow block for exerting the driving force may not be increased.

Preferably, the protruding amount WL of the first wall surfaces 12 is not less than 3% of the distance Lw in the tire circumferential direction between the first wall surfaces 12 adjacent in the tire circumferential direction.

The groove wall protruding portion 11 having such first wall surfaces 12 can improve the on-snow performance of the tire 1 since the first wall surfaces 12 can appropriately bite into the snow to exert a large driving force.

In the present embodiment, the distance Lw in the tire circumferential direction between the first wall surfaces 12 is equal to the distance Lb in the tire circumferential direction between the first bottom surfaces 8 adjacent in the tire circumferential direction.

Since the shapes of the groove bottom 5 and the groove wall 6 are specifically defined as described above, the tire 1 having such circumferential grooves 3 can provide good on-snow performance under both conditions of the tire 1 being not worn and worn.

Figure 6:
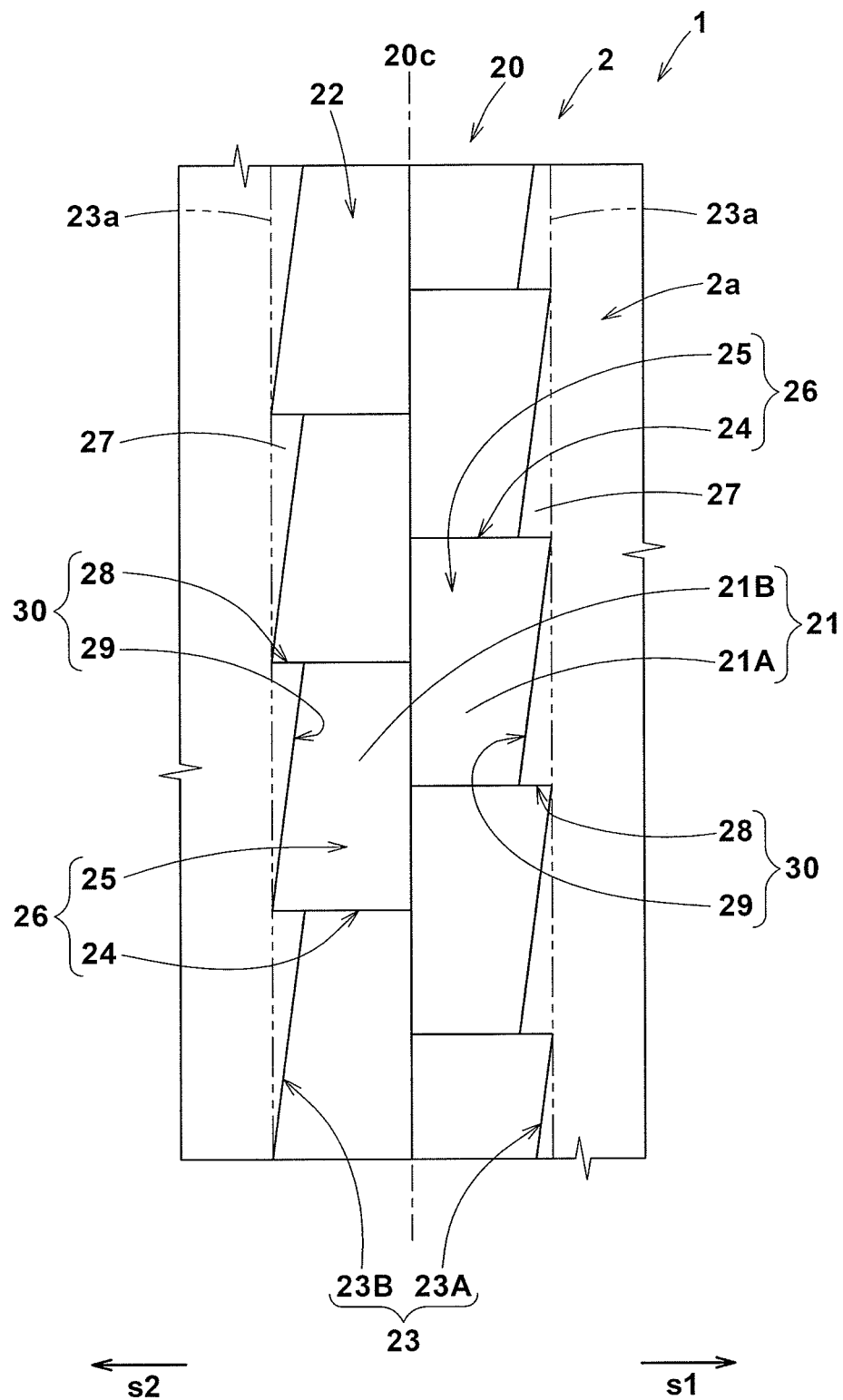
FIG. 6 is a partial top view of a circumferential groove of another embodiment.

FIG. 6 shows a circumferential groove 20 of another embodiment of the tire 1.

The circumferential groove 20 has a groove bottom 22 provided with groove bottom raised portions 21, and a pair of groove walls 23 extending in the tire radial direction from the groove bottom 22 toward the tread surface 2a.

The groove bottom raised portions 21 include a first groove bottom raised portion 21A located on the first side S1 in the width direction of the circumferential groove 20, and a second groove bottom raised portion 21B located on the second side S2 in the width direction.

It is preferable that each of the first groove bottom protruding portion 21A and the second groove bottom protruding portion 21B comprises a plurality of repeating units 26 each comprising a first bottom surface 24 extending in the tire radial direction, and a second bottom surface inclined with respect to the tire radial direction at a larger angle than the first bottom surface 24.

In the present embodiment, each of the first bottom surface 24 and the second bottom surface 25 is a flat surface.

In the present embodiment, the first bottom surfaces 24 of the first groove bottom raised portion 21A are disposed at different circumferential positions from the first bottom surfaces 24 of the second groove bottom raised portion 21B. Such groove bottom raised portions 21A and 21B can form a passage extending across the boundary between the first groove bottom raised portion 21A and the second groove bottom raised portion 21B. Therefore, in the circumferential groove 20 of the present embodiment, water can flow smoothly along the groove bottom 22 through this passage, so the wet performance is improved, and the effect of suppressing the hydroplaning phenomenon is exhibited.

In this example, the first bottom surfaces 24 of the first groove bottom raised portion 21A are disposed at respective intermediate positions in the tire circumferential direction between the first bottom surfaces 24 of the second groove bottom raised portions 21B.

In the present embodiment, the boundary between the first groove bottom raised portions 21A and the second groove bottom raised portions 21B is positioned on the widthwise center line 20c of the circumferential groove 20 in the top view thereof as shown in FIG. 6.

Such groove bottom raised portions 21A and 21B exhibits comparable on-snow performance regardless of the direction of rotation of the tire 1 since the first groove bottom raised portion 21A and the second groove bottom raised portion 21B are arranged evenly in the widthwise direction, more specifically, arranged in 180-degree rotational symmetry.

The pair of groove walls 23 are a first groove wall 23A located on the first side S1 and a second groove wall 23B located on the second side S2.

It is preferable that at least one of the first groove wall 23A and the second groove wall 23B is provided with a groove wall protruding portion 27 protruding inward of the circumferential groove 20 from a groove wall reference plane 23a. The groove wall reference plane 23a is defined by a plane being parallel to the tire circumferential direction and positioned at the widest position of the groove width W of the circumferential groove 20.

The groove wall protruding portion 27 comprises a plurality of repeating units 30 each comprising a first wall surface 28 extending in the tire widthwise direction, and a second wall surface 29 inclined with respect to the tire widthwise direction at a larger angle than the first wall surface 28.

In the present embodiment, each of the first wall surface 28 and the second wall surface 29 is a flat surface.

In the present embodiment, the first wall surfaces 28 of the first groove wall 23A are respectively disposed at the same positions in the tire circumferential direction as the first bottom surfaces 24 of the first groove bottom raised portions 21A.

Further, the first wall surfaces 28 of the second groove wall 23B are respectively disposed at the same positions in the tire circumferential direction as the first bottom surfaces 24 of the second groove bottom raised portions 21B.

Such circumferential groove 20 can more effectively improve the on-snow performance owing to the groove bottom raised portions 21 biting into the snow compressed by the groove walls 23A and 23B.

Figure 7:
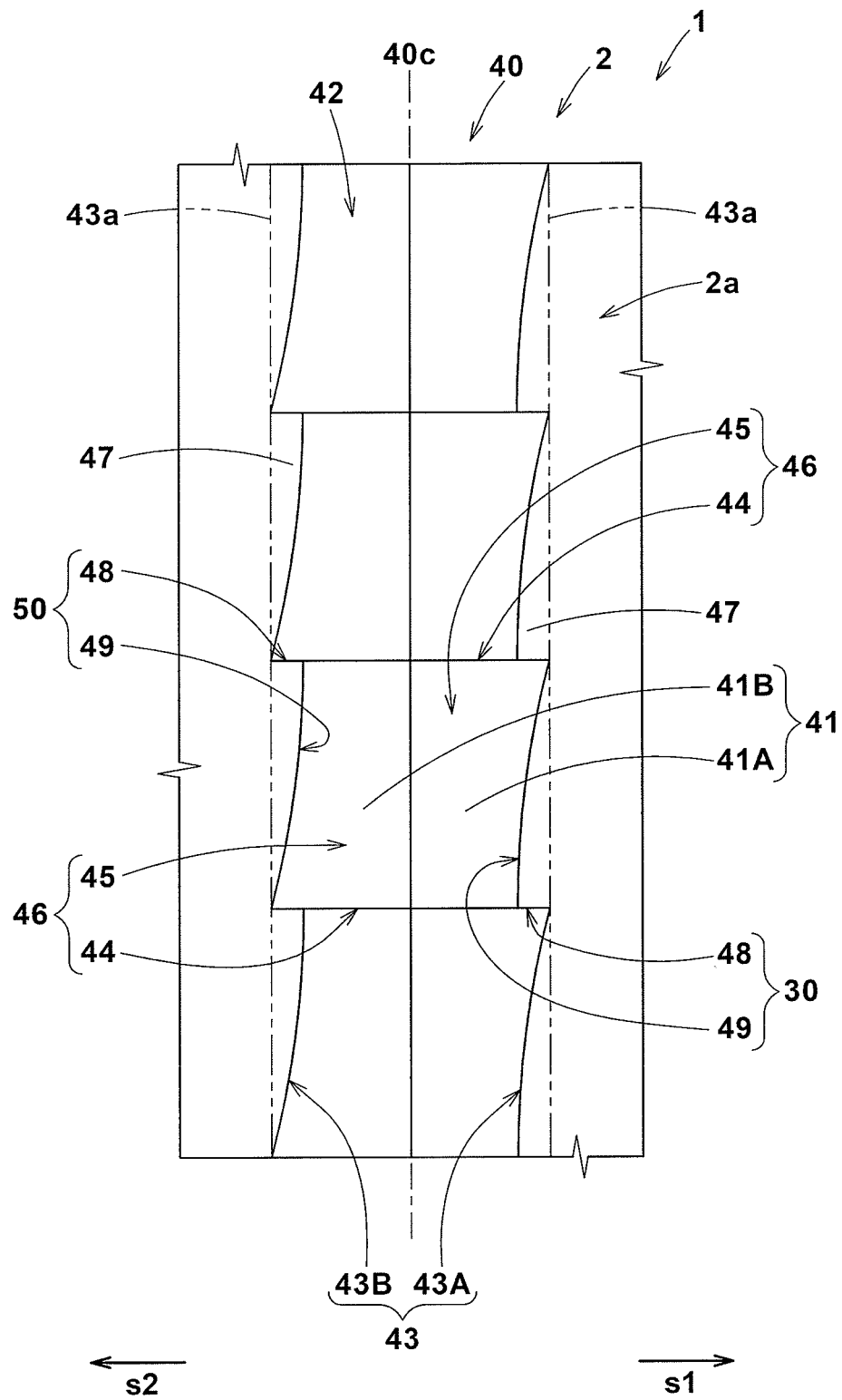
FIG. 7 is a partial top view of a circumferential groove of still another embodiment.

FIG. 7 shows a circumferential groove 40 of still another embodiment of the tire 1.

The circumferential groove 40 has a groove bottom 42 provided with groove bottom raised portions 41, and a pair of groove walls 43 extending in the tire radial direction from the groove bottom 42 toward the tread surface 2a.

The groove bottom raised portions 41 are a first groove bottom raised portion 41A located on the first side S1 in the width direction of the circumferential groove 40, and a second groove bottom raised portion 41B located on the second side S2 in the width direction of the circumferential groove 40.

It is preferable that each of the first groove bottom raised portion 41A and the second groove bottom raised portion 41B comprises a plurality of repeating units 46 each comprising a first bottom surface 44 extending in the tire radial direction, and a second bottom surface 45 inclined with respect to the tire radial direction at a larger angle than the first bottom surface 44.

In the present embodiment, each of the first bottom surface 44 and the second bottom surface 45 is a flat surface.

In the present embodiment, the border between the first groove bottom raised portion 41A and the second groove bottom raised portion 41B is positioned on the widthwise center line 40c of the circumferential groove 40 in the top view thereof as shown in FIG. 7. Such groove bottom raised portions 41 exhibit comparable on-snow performance regardless of the direction of rotation of the tire 1 since the first groove bottom raised portion 41A and the second groove bottom raised portion 41B are arranged evenly in the widthwise direction, more specifically, arranged in 180-degree rotational symmetry.

The pair of groove walls 43 are a first groove wall 43A located on the first side S1 and a second groove wall 43B located on the second side S2.

It is preferable that at least one of the first groove wall 43A and the second groove wall 43B is provided with a groove wall protruding portion 47 protruding inward of the circumferential groove 40 from a groove wall reference plane 43a. The groove wall reference plane 43a is defined by a plane being parallel to the tire circumferential direction and positioned at the widest position of the groove width W of the circumferential groove 40.

In the present embodiment, the groove wall protruding portion 47 comprises a plurality of repeating units 50 each comprising a first wall surface 48 extending in the tire widthwise direction and a second wall surface 49 inclined with respect to the tire widthwise direction at a larger angle than the first wall surface 48.

In the present embodiment, the first wall surface 48 is a flat surface, and the second wall surface 49 is a curved surface.

In such groove wall protruding portion 47, when the snow is moved along and relatively to the curved second wall surface 49, the compressing of the snow is furthered, and the shear force of the compressed snow block may be increased.

In the present embodiment, the second wall surface 49 is curved convexly toward the inside of the circumferential groove 40 as shown in FIG. 7. But, it may be curved concavely.

While detailed description has been made of preferable embodiments of the present invention, the present invention can be embodied in various forms without being limited to the illustrated embodiments.

Comparative Tests

Pneumatic tires of size 255/55R17 (rim size 17×7J) were experimentally manufactured as test tires (practical example Ex1, practical Example Ex2 and comparative example Ref).

The practical example Ex1 was provided with a plurality of the circumferential grooves 3 having the groove bottom raised portions 7A and 7B and the groove wall protruding portions 11 shown in FIGS. 1 to 5.

The practical example Ex2 was provided with a plurality of the circumferential grooves 20 having the groove bottom raised portions 21A and 21B and the groove wall protruding portions 27 shown in FIG. 6.

The comparative example Ref was provided with a plurality of circumferential grooves not having the groove bottom raised portion and the groove wall protruding portion.

Under two conditions where the test tires were not worn (namely, new) and the test tires were worn to 50% of the wear limit, each test tire was tested for on-snow performance when running on snow, wet performance when running on a wet road, and noise performance when running on a dry road by the use of a medium-sized passenger car whose all wheels had the same test tires inflated to 230 kPa.

<On-Snow Performance Test>

Based on driving performance, braking performance and steering stability when running the test vehicle on a snowy road surface, a test driver who had evaluation skills evaluated on-snow performance of each test tire. The results are indicated in Table 1 by an index based on the comparative example being 100, wherein the larger the value, the better the on-snow performance.

<Wet Performance Test>

Also based on driving performance, braking performance and steering stability when running the test vehicle on a wet road surface, the test driver evaluated wet performance of each test tire. The results are indicated in Table 1 by an index based on the comparative example being 100, wherein the larger the value, the better the wet performance.

<Noise Performance Test>

When the test vehicle was run at a speed of 80 km/h on a test course for measuring road noise, the noise was measured with a microphone set at a position near the window-side ear of the test driver, and the sound pressure level of a highest peak occurring in a narrow band around 1 KHZ was obtained. The results are indicated in Table 1 by an index based on the comparative example Ref being 100, wherein the smaller the number, the better the noise performance.

TABLE 1

| Tire | Ref | Ex1 | Ex2 |
|---|---|---|---|
| on-snow performance | | | |
| not worn | 100 | 145 | 145 |
| 50% worn | 100 | 160 | 155 |
| wet performance | | | |
| not worn | 100 | 100 | 100 |
| 50% worn | 100 | 97 | 100 |
| noise performance | 100 | 94 | 94 |

From the test results, it was confirmed that the tires according to the present invention were superior in the on-snow performance to the comparative example tire, and maintained good on-snow performance even under the worn condition.

Further, it was confirmed that the tires according to the present invention maintained the wet performance comparable to the comparative example tire, and the tire Ex2 maintained the same wet performance even under the worn condition.

Furthermore, it was confirmed that, as compared with the comparative example tire, the tires according to the present invention were superior in the noise performance when running on dry roads, and the air resonance noise was reduced.

DESCRIPTION OF THE REFERENCE SIGNS 2a tread surface
3 circumferential groove
5 groove bottom
5a groove bottom reference plane
6 groove wall
7 groove bottom raised portion
7A first groove bottom raised portion
7B second groove bottom raised portion
8 first bottom surface
9 second bottom surface
10 repeating unit

The invention claimed is:

1. A tire comprising:
a tread portion having a tread surface and provided with a circumferential groove extending continuously in the tire circumferential direction, the circumferential groove having a groove bottom and a pair of groove walls extending radially outwardly from the groove bottom toward the tread surface, wherein
the groove bottom is provided with groove bottom raised portions protruding radially outwardly from a groove bottom reference plane which is defined by a plane being parallel to the tread surface and positioned at a deepest position of the circumferential groove,
the groove bottom raised portions consist of
a first groove bottom raised portion located on a first side in a width direction of the circumferential groove, and
a second groove bottom raised portion located on a second side in the width direction of the circumferential groove,
the first groove bottom raised portion and the second groove bottom raised portion have their border positioned on the widthwise center line of the circumferential groove in the top view of the circumferential groove, and
each of the first groove bottom raised portion and the second groove bottom raised portion consists of a plurality of repeating units each consisting of
a first bottom surface extending substantially in the tire radial direction at an inclining angle in a range from −10 degrees to +10 degrees with respect to the tire radial direction, and
a second bottom surface inclined with respect to the tire radial direction at a larger angle than the first bottom surface, and wherein
the pair of groove walls are a first groove wall positioned on the first side and a second groove wall positioned on the second side,
each of the first groove wall and the second groove wall is provided with a groove wall protruding portion protruding inward of the circumferential groove from a groove wall reference plane defined by a plane being parallel to the tire circumferential direction and positioned at a widest position of the groove width of the circumferential groove, the groove wall protruding portion comprises a plurality of repeating units each comprising
- a first wall surface extending in the tire widthwise direction, and
- a second wall surface inclined with respect to the tire widthwise direction at a larger angle than the first wall surface, wherein the radial height of the groove wall protruding portion is the same as the depth of the circumferential groove whereby only one groove wall protruding portion is provided in the groove depth direction, wherein
on the first side of the widthwise center line of the circumferential groove,
the first bottom surfaces are oriented to one side in the longitudinal direction of the circumferential groove, and
the first wall surfaces are oriented to the other side in the longitudinal direction of the circumferential groove, and
on the second side of the widthwise center line of the circumferential groove,
the first bottom surfaces are oriented to said other side in the longitudinal direction of the circumferential groove, and
the first wall surfaces are oriented to said one side in the longitudinal direction of the circumferential groove, wherein
the first bottom surfaces and the second bottom surfaces of the repeating units of the first groove bottom raised portion extend from the border to the first groove wall so that the second bottom surfaces intersect the second wall surfaces, respectively, of the first groove wall, and the first bottom surfaces and the second bottom surfaces of the repeating units of the second groove bottom raised portion extend from the border to the second groove wall so that the second bottom surfaces intersect the second wall surfaces, respectively, of the second groove wall, whereby each of the second wall surface has two radially extending edges which are an inside edge, and an outside edge positioned outside the inside edge in the widthwise direction of the groove, and the outside edge is shorter than the inside edge, so as to have a trapezoidal shape, wherein
the first bottom surfaces of the first groove bottom raised portion are respectively disposed at the same positions in the tire circumferential direction as the first bottom surfaces of the second groove bottom raised portion, and
on each of the first side and the second side of the widthwise center line of the circumferential groove, the first bottom surfaces are respectively disposed at the same positions in the tire circumferential direction as the first wall surfaces of the groove wall protruding portion, whereby circumferential extents of the second bottom surfaces respectively correspond to circumferential extents of the second wall surfaces which are respectively intersected by the second bottom surfaces.

2. A tire comprising:
a tread portion having a tread surface and provided with a circumferential groove extending continuously in the tire circumferential direction, the circumferential groove having a groove bottom and a pair of groove walls extending radially outwardly from the groove bottom toward the tread surface, wherein the groove bottom is provided with groove bottom raised portions protruding radially outwardly from a groove bottom reference plane which is defined by a plane being parallel to the tread surface and positioned at a deepest position of the circumferential groove, the groove bottom raised portions consist of
- a first groove bottom raised portion located on a first side in a width direction of the circumferential groove, and
- a second groove bottom raised portion located on a second side in the width direction of the circumferential groove, the first groove bottom raised portion and the second groove bottom raised portion have their border positioned on the widthwise center line of the circumferential groove in the top view of the circumferential groove, and each of the first groove bottom raised portion and the second groove bottom raised portion consists of a plurality of repeating units each consisting of
- a first bottom surface extending substantially in the tire radial direction at an inclining angle in a range from −10 degrees to +10 degrees with respect to the tire radial direction, and
- a second bottom surface inclined with respect to the tire radial direction at a larger angle than the first bottom surface, and wherein the pair of groove walls are a first groove wall positioned on the first side and a second groove wall positioned on the second side, each of the first groove wall and the second groove wall is provided with a groove wall protruding portion protruding inward of the circumferential groove from a groove wall reference plane defined by a plane being parallel to the tire circumferential direction and positioned at a widest position of the groove width of the circumferential groove, the groove wall protruding portion comprises a plurality of repeating units each comprising
- a first wall surface extending in the tire widthwise direction, and
- a second wall surface inclined with respect to the tire widthwise direction at a larger angle than the first wall surface, wherein the radial height of the groove wall protruding portion is the same as the depth of the circumferential groove whereby only one groove wall protruding portion is provided in the groove depth direction, wherein on the first side of the widthwise center line of the circumferential groove, the first bottom surfaces are oriented to one side in the longitudinal direction of the circumferential groove, and
the first wall surfaces are oriented to the other side in the longitudinal direction of the circumferential groove, and
on the second side of the widthwise center line of the circumferential groove, the first bottom surfaces are oriented to said other side in the longitudinal direction of the circumferential groove, and
the first wall surfaces are oriented to said one side in the longitudinal direction of the circumferential groove, wherein
　the first bottom surfaces and the second bottom surfaces of the repeating units of the first groove bottom raised portion extend from the border to the first groove wall so that the second bottom surfaces intersect the second wall surfaces, respectively, of the first groove wall, and the first bottom surfaces and the second bottom surfaces of the repeating units of the second groove bottom raised portion extend from the border to the second groove wall so that the second bottom surfaces intersect the second wall surfaces, respectively, of the second groove wall, whereby each of the second wall surface has two radially extending edges which are an inside edge, and an outside edge positioned outside the inside edge in the widthwise direction of the groove, and the outside edge is shorter than the inside edge, so as to have a trapezoidal shape, wherein
　the first bottom surfaces of the first groove bottom raised portion are respectively disposed at different positions in the tire circumferential direction from the first bottom surfaces of the second groove bottom raised portion, and
　on each of the first side and the second side of the widthwise center line of the circumferential groove, the first bottom surfaces are respectively disposed at the same positions in the tire circumferential direction as the first wall surfaces of the groove wall protruding portion, whereby circumferential extents of the second bottom surfaces respectively correspond to circumferential extents of the second wall surfaces which are respectively intersected by the second bottom surfaces.

3. A tire comprising:
　a tread portion having a tread surface and provided with a circumferential groove extending continuously in the tire circumferential direction, the circumferential groove having a groove bottom and a pair of groove walls extending radially outwardly from the groove bottom toward the tread surface, wherein
　the groove bottom is provided with groove bottom raised portions protruding radially outwardly from a groove bottom reference plane which is defined by a plane being parallel to the tread surface and positioned at a deepest position of the circumferential groove,
　the groove bottom raised portions consist of
　　a first groove bottom raised portion located on a first side in a width direction of the circumferential groove, and
　　a second groove bottom raised portion located on a second side in the width direction of the circumferential groove,
　the first groove bottom raised portion and the second groove bottom raised portion have their border positioned on the widthwise center line of the circumferential groove in the top view of the circumferential groove, and
　each of the first groove bottom raised portion and the second groove bottom raised portion consists of a plurality of repeating units each consisting of
　　a first bottom surface extending substantially in the tire radial direction at an inclining angle in a range from −10 degrees to +10 degrees with respect to the tire radial direction, and
　　a second bottom surface inclined with respect to the tire radial direction at a larger angle than the first bottom surface, and wherein the pair of groove walls are a first groove wall positioned on the first side and a second groove wall positioned on the second side,
　each of the first groove wall and the second groove wall is provided with a groove wall protruding portion protruding inward of the circumferential groove from a groove wall reference plane defined by a plane being parallel to the tire circumferential direction and positioned at a widest position of the groove width of the circumferential groove,
　the groove wall protruding portion comprises a plurality of repeating units each comprising
　　a first wall surface extending in the tire widthwise direction, and
　　a second wall surface inclined with respect to the tire widthwise direction at a larger angle than the first wall surface,
　wherein the radial height of the groove wall protruding portion is the same as the depth of the circumferential groove whereby only one groove wall protruding portion is provided in the groove depth direction,
　wherein on the first side of the widthwise center line of the circumferential groove,
　　the first groove bottom raised portion is configured such that each of the second bottom surfaces extends from a radially outer edge of one of the first bottom surfaces to a radially inner edge of next one of the first bottom surfaces which is positioned on one side in the longitudinal direction of the circumferential groove, while inclining radially inward, and
　　the first groove wall protruding portion is configured such that each of the second wall surfaces extends from an inner edge of one of the first wall surfaces to an outer edge of next one of the first wall surfaces which is positioned on the other side in the longitudinal direction of the circumferential groove, while inclining outside in the width direction of the circumferential groove, and
　on the second side of the widthwise center line of the circumferential groove,
　　the second groove bottom raised portion is configured such that each of the second bottom surfaces extends from a radially outer edge of one of the first bottom surfaces to a radially inner edge of next one of the first bottom surfaces which is positioned on said other side in the longitudinal direction of the circumferential groove, while inclining radially inward, and
　　the groove wall protruding portion is configured such that each of the second wall surfaces extends from an inner edge of one of the first wall surfaces to an outer edge of next one of the first wall surfaces which is positioned on said one side in the longitudinal direction of the circumferential groove, while inclining outside in the width direction of the circumferential groove,
　whereby on the first side of the widthwise center line of the circumferential groove,
　　the first bottom surfaces are oriented to said other side in the longitudinal direction of the circumferential groove, and
　　the first wall surfaces are oriented to said one side in the longitudinal direction of the circumferential groove, and
　on the second side of the widthwise center line of the circumferential groove, the first bottom surfaces are oriented to said one side in the longitudinal direction of the circumferential groove, and the first wall surfaces are oriented to said other side in the longitudinal direction of the circumferential groove, wherein the first bottom surfaces and the second bottom surfaces of the repeating units of the first groove bottom raised portion extend from the border to the first groove wall so that the second bottom surfaces intersect the second wall surfaces, respectively, of the first groove wall, and the first bottom surfaces and the second bottom surfaces of the repeating units of the second groove bottom raised portion extend from the border to the second groove wall so that the second bottom surfaces intersect the second wall surfaces, respectively, of the second groove wall, whereby each of the second wall surfaces has two radially extending edges which are an inside edge, and an outside edge positioned outside the inside edge in the widthwise direction of the groove, and the outside edge is shorter than the inside edge, so as to have a trapezoidal shape.

4. The tire according to claim 3, wherein
the first bottom surfaces of the first groove bottom raised portion are respectively disposed at different positions in the tire circumferential direction from the first bottom surfaces of the second groove bottom raised portion, and on each of the first side and the second side of the widthwise center line of the circumferential groove, the first bottom surfaces are respectively disposed at the same positions in the tire circumferential direction as the first wall surfaces of the groove wall protruding portion, whereby circumferential extents of the second bottom surfaces respectively correspond to circumferential extents of the second wall surfaces which are respectively intersected by the second bottom surfaces.

5. The tire according to claim 4, wherein
the radial height of each of the first bottom surfaces from said groove bottom reference plane is not less than 1 mm.

6. The tire according to claim 5, wherein
the protruding amount in the tire widthwise direction of each of the first wall surfaces from the groove wall reference plane is not less than 1 mm.

7. The tire according to claim 4, wherein
each said second wall surface is a flat surface in the top view of the circumferential groove.

8. The tire according to claim 7, wherein
each said first wall surface is a flat surface, and is parallel with the depth direction of the circumferential groove.

9. The tire according to claim 8, wherein
each said first bottom surface is a substantially flat surface, and is orthogonal to the widthwise center line of the circumferential groove in the top view of the circumferential groove.

10. The tire according to claim 3, wherein
the first bottom surfaces of the first groove bottom raised portion are respectively disposed at the same positions in the tire circumferential direction as the first bottom surfaces of the second groove bottom raised portion, and on each of the first side and the second side of the widthwise center line of the circumferential groove, the first bottom surfaces are respectively disposed at the same positions in the tire circumferential direction as the first wall surfaces of the groove wall protruding portion, whereby circumferential extents of the second bottom surfaces respectively correspond to circumferential extents of the second wall surfaces which are respectively intersected by the second bottom surfaces.

11. The tire according to claim 10, wherein
the radial height of each of the first bottom surfaces from said groove bottom reference plane is not less than 1 mm.

12. The tire according to claim 11, wherein
the protruding amount in the tire widthwise direction of each of the first wall surfaces from the groove wall reference plane is not less than 1 mm.

13. The tire according to claim 10, wherein
the radial height of each of the first bottom surfaces from the groove bottom reference plane is not less than 3% of a distance in the tire circumferential direction between the first bottom surfaces adjacent in the tire circumferential direction.

14. The tire according to claim 13, wherein
the protruding amount in the tire widthwise direction of each of the first wall surfaces from the groove wall reference plane is not less than 3% of a distance in the tire circumferential direction between the first wall surfaces adjacent in the tire circumferential direction.

15. The tire according to claim 10, wherein
each said second wall surface is a curved surface in the top view of the circumferential groove.

16. The tire according to claim 15, wherein
each said first wall surface is a flat surface, and is parallel with the depth direction of the circumferential groove.

17. The tire according to claim 16, wherein
each said first bottom surface is a substantially flat surface, and is orthogonal to the widthwise center line of the circumferential groove in the top view of the circumferential groove.

18. The tire according to claim 10, wherein
each said second wall surface is a flat surface in the top view of the circumferential groove.

19. The tire according to claim 18, wherein
in the top view of the circumferential groove, the second wall surfaces of the first groove wall are substantially parallel to the second wall surfaces of the second groove wall.

20. The tire according to claim 18, wherein
each said first wall surface is a flat surface, and is parallel with the depth direction of the circumferential groove.

21. The tire according to claim 20, wherein
each said first bottom surface is a substantially flat surface, and is orthogonal to the widthwise center line of the circumferential groove in the top view of the circumferential groove.

* * * * *